(12) United States Patent
L'Huillier et al.

(10) Patent No.: US 10,878,017 B1
(45) Date of Patent: Dec. 29, 2020

(54) SYSTEM AND METHOD FOR PROGRAMMATIC GENERATION OF ATTRIBUTE DESCRIPTORS

(71) Applicant: Groupon, Inc., Chicago, IL (US)

(72) Inventors: Gaston L'Huillier, San Francisco, CA (US); Jonathan Esterhazy, San Francisco, CA (US); Dor Levi, San Francisco, CA (US); Amit Koren, Chicago, IL (US); Daniel Langdon, Las Condes (CL); Bhupesh Bansal, Sunnyvale, CA (US); Feras Karablieh, Issaquah, WA (US); Hernan Enrique Arroyo Garcia, Mountain View, CA (US); Srinivasa Raghavan Vedanarayanan, Sunnyvale, CA (US); Shawn Ryan Jeffrey, Burlingame, CA (US); Francisco Jose Larrain, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 156 days.

(21) Appl. No.: 14/811,521

(22) Filed: Jul. 28, 2015

Related U.S. Application Data

(60) Provisional application No. 62/030,549, filed on Jul. 29, 2014, provisional application No. 62/033,090, filed on Aug. 4, 2014.

(51) Int. Cl.
*G06F 17/00* (2019.01)
*G06F 7/00* (2006.01)
(Continued)

(52) U.S. Cl.
CPC ............ *G06F 16/35* (2019.01); *G06F 40/232* (2020.01); *G06F 40/40* (2020.01)

(58) Field of Classification Search
CPC ... G06F 17/30705; G06F 17/273; G06F 17/28
(Continued)

(56) References Cited

U.S. PATENT DOCUMENTS

| | | |
|---|---|---|
| 5,331,556 A | 7/1994 | Black et al. |
| 5,706,406 A | 1/1998 | Pollock |

(Continued)

OTHER PUBLICATIONS

Sato et al. "Topic Models with Power-Law Using Pitman-Yor Process", Jul. 25-28, 2010, KDD'10, pp. 673-681.*

(Continued)

*Primary Examiner* — Pavan Mamillapalli
(74) *Attorney, Agent, or Firm* — Alston & Bird LLP

(57) ABSTRACT

Embodiments provide a computer-executable method, computer system and non-transitory computer-readable medium for programmatically processing text information to generate attribute descriptors contained therein. The method includes programmatically accessing, via a network device, a textual unit, the textual unit associated with a commercial entity or a commercial object. The method also includes executing a text processing engine to programmatically generate an attribute descriptor from the textual unit. The method further includes storing, on a non-transitory computer-readable storage device, the attribute descriptor in association with identification of the commercial entity or the commercial object.

17 Claims, 7 Drawing Sheets

(51) Int. Cl.
*G06F 16/35* (2019.01)
*G06F 40/40* (2020.01)
*G06F 40/232* (2020.01)

(58) Field of Classification Search
USPC .......................................................... 707/740
See application file for complete search history.

(56) References Cited

U.S. PATENT DOCUMENTS

| | | | |
|---|---|---|---|
| 5,963,940 A | 10/1999 | Liddy et al. | |
| 6,577,947 B1* | 6/2003 | Kronfeld | G01C 21/00 701/301 |
| 6,584,464 B1 | 6/2003 | Warthen | |
| 6,910,003 B1 | 6/2005 | Arnold et al. | |
| 6,950,786 B1* | 9/2005 | Sonneland | G01V 1/301 702/16 |
| 7,015,922 B2* | 3/2006 | Wada | G06F 16/9577 345/581 |
| 7,107,538 B1* | 9/2006 | Hinckley | G06F 21/62 707/999.01 |
| 7,444,356 B2 | 10/2008 | Calistri-Yeh et al. | |
| 7,552,365 B1 | 6/2009 | Marsh et al. | |
| 7,600,017 B2 | 10/2009 | Holtzman et al. | |
| 7,765,097 B1 | 7/2010 | Yu et al. | |
| 7,900,213 B2* | 3/2011 | Elaasar | G06F 9/44521 719/318 |
| 7,945,600 B1 | 5/2011 | Thomas et al. | |
| 8,001,144 B2 | 8/2011 | Novak | |
| 8,046,348 B1 | 10/2011 | Rehling et al. | |
| 8,195,683 B2 | 6/2012 | Bolivar | |
| 8,209,335 B2 | 6/2012 | Novak | |
| 8,347,326 B2 | 1/2013 | Weitzenfeld et al. | |
| 8,645,295 B1* | 2/2014 | Dillard | G06Q 30/02 705/7.29 |
| 8,862,591 B2 | 10/2014 | Chowdhury et al. | |
| 8,949,243 B1 | 2/2015 | Kashyap et al. | |
| 8,977,953 B1 | 3/2015 | Pierre et al. | |
| 8,983,975 B2 | 3/2015 | Kenton et al. | |
| 9,020,956 B1 | 4/2015 | Barr et al. | |
| 9,063,927 B2 | 6/2015 | Hall | |
| 9,129,008 B1 | 9/2015 | Kuznetsov | |
| 9,317,566 B1 | 4/2016 | L'Huillier et al. | |
| 9,607,325 B1 | 3/2017 | Sriram | |
| 9,924,102 B2* | 3/2018 | Gervautz | H04L 67/32 |
| 2001/0020292 A1* | 9/2001 | McRobert | G06F 40/186 717/100 |
| 2002/0010637 A1* | 1/2002 | Lieu | G06Q 30/06 705/26.1 |
| 2002/0103809 A1 | 8/2002 | Starzl et al. | |
| 2002/0107834 A1* | 8/2002 | Yen | G06Q 10/06 707/999.001 |
| 2002/0165844 A1* | 11/2002 | Lee | G06Q 40/04 706/61 |
| 2003/0004971 A1* | 1/2003 | Gong | G06Q 10/087 |
| 2004/0059736 A1* | 3/2004 | Willse | G06F 40/20 707/999.1 |
| 2004/0078190 A1 | 4/2004 | Fass et al. | |
| 2004/0186719 A1 | 9/2004 | Polanyi et al. | |
| 2004/0243554 A1 | 12/2004 | Broder et al. | |
| 2005/0028046 A1* | 2/2005 | McArdle | G06F 17/30303 714/48 |
| 2005/0060324 A1* | 3/2005 | Johnson | G06Q 30/06 707/999.1 |
| 2005/0108001 A1 | 5/2005 | Aarskog | |
| 2005/0125216 A1* | 6/2005 | Chitrapura | G06F 40/30 704/1 |
| 2005/0149383 A1 | 7/2005 | Zacharia et al. | |
| 2005/0165819 A1 | 7/2005 | Kudoh et al. | |
| 2005/0267871 A1 | 12/2005 | Marchisio et al. | |
| 2006/0069589 A1 | 3/2006 | Nigam et al. | |
| 2006/0248440 A1 | 11/2006 | Rhoads et al. | |
| 2006/0277465 A1* | 12/2006 | Pandit | G06F 40/30 715/234 |
| 2007/0027672 A1* | 2/2007 | Decary | G06F 40/295 704/7 |
| 2007/0073533 A1 | 3/2007 | Thione et al. | |
| 2007/0073745 A1 | 3/2007 | Scott et al. | |
| 2007/0073758 A1 | 3/2007 | Perry et al. | |
| 2007/0094234 A1 | 4/2007 | Wen et al. | |
| 2007/0106499 A1 | 5/2007 | Dahlgren et al. | |
| 2007/0282872 A1* | 12/2007 | Probst | G06F 16/313 707/999.1 |
| 2008/0109212 A1 | 5/2008 | Witbrock et al. | |
| 2008/0133488 A1 | 6/2008 | Bandaru et al. | |
| 2008/0154883 A1* | 6/2008 | Chowdhury | G06F 3/0482 707/999.005 |
| 2008/0201348 A1* | 8/2008 | Edmonds | G06Q 30/02 707/999.101 |
| 2008/0249764 A1 | 10/2008 | Huang et al. | |
| 2008/0294637 A1 | 11/2008 | Liu | |
| 2009/0063247 A1 | 3/2009 | Burgess et al. | |
| 2009/0063304 A1 | 3/2009 | Meggs | |
| 2009/0077069 A1 | 3/2009 | Polanyi et al. | |
| 2009/0112892 A1 | 4/2009 | Cardie et al. | |
| 2009/0193328 A1 | 7/2009 | Reis et al. | |
| 2009/0216524 A1 | 8/2009 | Skubacz et al. | |
| 2009/0217208 A1 | 8/2009 | Mushtaq et al. | |
| 2009/0222551 A1 | 9/2009 | Neely et al. | |
| 2009/0282019 A1 | 11/2009 | Galitsky et al. | |
| 2009/0319342 A1 | 12/2009 | Shilman et al. | |
| 2010/0038416 A1 | 2/2010 | Canora | |
| 2010/0198584 A1 | 8/2010 | Habu et al. | |
| 2011/0078167 A1 | 3/2011 | Sundaresan et al. | |
| 2011/0196927 A1 | 8/2011 | Vance | |
| 2012/0066233 A1 | 3/2012 | Fonseka et al. | |
| 2012/0101808 A1 | 4/2012 | Duong-Van | |
| 2012/0209828 A1* | 8/2012 | Takenaka | G06F 16/254 707/710 |
| 2012/0254060 A1 | 10/2012 | Choudhary et al. | |
| 2012/0278064 A1 | 11/2012 | Leary et al. | |
| 2012/0278253 A1 | 11/2012 | Gahlot et al. | |
| 2012/0290606 A1 | 11/2012 | Kumar et al. | |
| 2012/0290910 A1 | 11/2012 | Kumar et al. | |
| 2013/0018892 A1 | 1/2013 | Castellanos et al. | |
| 2013/0031062 A1* | 1/2013 | Iwamoto | G06F 17/30303 707/692 |
| 2013/0080208 A1 | 3/2013 | Wang et al. | |
| 2013/0103667 A1 | 4/2013 | Minh | |
| 2013/0218822 A1 | 8/2013 | Remaker | |
| 2013/0247183 A1* | 9/2013 | Kumar | G06F 21/56 726/22 |
| 2013/0263019 A1 | 10/2013 | Castellanos et al. | |
| 2013/0268457 A1 | 10/2013 | Wang et al. | |
| 2013/0268534 A1* | 10/2013 | Mathew | G06F 40/40 707/740 |
| 2013/0311315 A1 | 11/2013 | Zises | |
| 2014/0067596 A1 | 3/2014 | McGovern et al. | |
| 2014/0136541 A1 | 5/2014 | Farahat et al. | |
| 2014/0188459 A1 | 7/2014 | Fink et al. | |
| 2014/0278786 A1 | 9/2014 | Liu-Qiu-Yan | |
| 2015/0066803 A1 | 3/2015 | Aneja et al. | |
| 2015/0100554 A1* | 4/2015 | Wang | G06F 16/2246 707/692 |
| 2015/0186790 A1 | 7/2015 | Ehlen et al. | |
| 2015/0286627 A1 | 10/2015 | Chang et al. | |
| 2015/0286710 A1 | 10/2015 | Chang et al. | |
| 2015/0286928 A1 | 10/2015 | Demiralp et al. | |
| 2016/0275573 A1 | 9/2016 | L'Huillier et al. | |

OTHER PUBLICATIONS

Fuchs, Gil Emanuel; "Practical Natural Language Processing Question Answering Using Graphs"; Dec. 2004; University of California.

Notice of Allowance for U.S. Appl. No. 12/119,465 dated Jan. 4, 2017.

Das, S.R. et al., *Yahoo! for Amazon: Sentiment Extraction from Small Talk on the Web*, Management Science, (Jan. 5, 2006) pp. 1-30.

Gamon, M., *Sentiment Classification on Customer Feedback Data: Noisy Data, Large Feature Vectors, and the Role of Linguistic*

(56) References Cited

OTHER PUBLICATIONS

*Analysis*, International Conference on Computational Linguistics, (2004) 7 pages.
Garcia, A. et al., *Defeasible Logic Programming an Argumentative Approach*, Theory and Practice of Logic Programming, (2004) [online][retrieved Dec. 14, 2015]. Retrieved from the internet: <URL: http://cs.uns.edu.ar/~ajg/papers/2004TPLPGarciaSimari.pdf> 95-137.
Glance, N. et al., *Deriving Marketing Intelligence from Online Discussion*, KDD '05, ACM, Chicago, Illinois, USA, (Aug. 21-24, 2005) 9 pages.
International Search Report and Written Opinion for corresponding International Application No. PCT/US09/43658 dated Jul. 14, 2009, 8 pages.
*Kango Announces Series A Funding and Private Beta Status*, Press Release. UpTake Networks, Inc., 2007, [Online] [Retrieved on Jun. 25, 2009] Retrieved from the internet<URL: http://www.uptake.com/documents/press/121807.pdf> 2 pages.
Marneffe, M.C. et al., *Stanford typed dependencies manual*, [online][retrieved Dec. 14, 2015]. Retrieved from the internet: <URL: http://nlp.stanford.edu/software/dependencies_manual.pdf>. (Sep. 2008) 28 pages.
Notice of Allowance for corresponding U.S. Appl. No. 14/727,852 dated Dec. 16, 2015.
Office Action for corresponding U.S. Appl. No. 12/119,465 dated Apr. 4, 2013.
Office Action for corresponding U.S. Appl. No. 12/119,465 dated Aug. 24, 2011.
Office Action for corresponding U.S. Appl. No. 12/119,465 dated Jan. 8, 2014.
Office Action for corresponding U.S. Appl. No. 12/119,465 dated May 22, 2014.
Office Action for corresponding U.S. Appl. No. 12/119,465 dated Sep. 7, 2012.
Office Action for corresponding U.S. Appl. No. 14/727,852 dated Sep. 18, 2015.
*Opinion Mining, Sentiment Analysis, and Opinion Spam Detection* [online] [retrieved Jun. 11, 2015]. Retrieved from the Internet: URL:http://www.cs.uic.edu/~liub/FBS/sentiment-analysis.html#lexicon. 8 pages.
Pang, B. et al., *Thumbs Up? Sentiment Classification Using Machine Learning Techniques*, in Proceedings of the Conference on Empirical Methods in Natural Language Processing (EMNLP) 2002, Philadelphia (Jul. 2002), 8 pages.

*SentiWordNet* [online] [retrieved Jun. 11, 2015]. Retrieved from the Internet: URL:http://sentiwordnet.isti.cnr.it/. 2 pages.
Shanahan, J. et al., *Computing Attitude and Affect in Text: Theory and Applications*, Springer, Dordrecht, Netherlands (2006) pp. 265-279.
Wiebe, J. et al., *Identifying Collocations for Recognizing Opinions*, in Proceedings of ACL/EACL '01 Workshop on Collocation, Toulouse, France (Jul. 2001) 8 pages.
U.S. Appl. No. 14/727,852, filed Jun. 1, 2015, In re: L'Hullier et al. entitled *Method and System for Programmatic Analysis of Consumer Reviews*.
Office Action for corresponding U.S. Appl. No. 12/119,465 dated Dec. 30, 2010.
Office Action for U.S. Appl. No. 15/073,486 dated Sep. 19, 2016.
U.S. Appl. No. 61/922,786, filed Dec. 31, 2013.
U.S. Appl. No. 62/030,549, filed Jul. 29, 2014, In re: L'Huillier et al. entitled *Method and System for Programmatic Analysis of Consumer Reviews*.
U.S. Appl. No. 62/018,456, filed Jun. 27, 2014, In re: Landon et al. entitled *Method and System for Programmatic Generation of Survey Queries*.
U.S. Appl. No. 62/033,090, filed Aug. 4, 2014, In re: L'Huillier et al. entitled *System and Method for Programmatic Generation of Attribute Descriptors*.
U.S. Appl. No. 14/919,111, filed Oct. 21, 2015, In re: L'Huillier, entitled *Method and System for Programmatic Analysis of Consumer Sentiment With Regard to Attribute Descriptions*.
U.S. Appl. No. 14/752,311, filed Jun. 26, 2015; In re: Landgon et al., entitled *Method and System for Programmatic Generation of Survey Queries*.
Opinion Mining, Sentiment Analysis, and Opinion Spam Detection [online] [retrieved Jun. 11, 2015], Retrieved from the nternet: URL:http://www.cs.uic.edu/~liub/FBS/sentiment-analysis.html#lexicon. 8 pages.
Marneffe, M.C. et al., Stanford typed dependencies manual, [online][retrieved Dec. 14, 2015], Retrieved from the nternet: <URL: http://nlp.stanford.edu/software/dependencies_manual.pdf>. (Sep. 2008) 28 pages.
Sentence Patterns—The Writing Center, [online], [retrieved from the Internet Sep. 28, 2018] <URL: http://writingcenter.unc.edu/tips-and-tools/sentence-patterns/> 5 pages.
Patent Board Decision for U.S. Appl. No. 12/119,465 dated Dec. 5, 2016, 10 pages.

* cited by examiner

Great for "pasta"

People love the "sushi"

SYSTEM AND METHOD FOR PROGRAMMATIC GENERATION OF ATTRIBUTE DESCRIPTORS

CROSS REFERENCE TO RELATED APPLICATIONS

This application claims the benefit of U.S. Provisional Patent Application No. 62/030,549, filed Jul. 29, 2014, and U.S. Provisional Patent Application No. 62/033,090, filed Aug. 4, 2014, each of which is incorporated by reference herein in its entirety.

TECHNOLOGICAL FIELD

Example embodiments of the present invention relate generally to a computer-executable method, a computer system and a computer apparatus for programmatically processing and analyzing textual information to generate attribute descriptors associated with one or more commercial entities (e.g., merchants, consumers) and/or one or more commercial objects (e.g., products, services, experiences, promotions) contained in the textual information.

BACKGROUND

Certain commercial retailers enable consumers to review merchants and products and/or service provides to review consumers. In this regard, areas for improving conventional techniques for automated processing, interpreting and using consumer review information have been identified and technical solutions have been implemented in exemplary embodiments.

BRIEF SUMMARY

Embodiments provide a computer-executable method, computer system and non-transitory computer-readable medium for programmatically processing text information to generate attribute descriptors contained therein.

In accordance with one exemplary embodiment, a computer-executed method is provided for programmatically processing text information to generate attribute descriptors contained therein. The method includes programmatically accessing, via a network device, a textual unit, the textual unit associated with a commercial entity or a commercial object. The method also includes executing a text processing engine to programmatically generate an attribute descriptor from the textual unit. The method further includes storing, on a non-transitory computer-readable storage device, the attribute descriptor in association with identification of the commercial entity or the commercial object.

In some embodiments, generating the attribute descriptor from the textual unit may include: preprocessing textual information from the textual unit; analyzing the pre-processed textual information to generate the attribute descriptor; generating a list of attribute descriptors based on the attribute descriptor and one or more other attribute descriptors generated from the from the textual unit; and validating the list of attribute descriptors.

In accordance with another exemplary embodiment, one or more non-transitory computer-readable media are provided, having encoded thereon one or more computer-executable instructions that, when executed on a computing device, performs a computer-executable method for programmatically processing text information to generate attribute descriptors contained therein. The method includes programmatically accessing, via a network device, a textual unit, the textual unit associated with a commercial entity or a commercial object. The method also includes executing a text processing engine to programmatically generate an attribute descriptor from the textual unit. The method further includes storing, on a non-transitory computer-readable storage device, the attribute descriptor in association with identification of the commercial entity or the commercial object.

In accordance with another exemplary embodiment, a computing system is provided. The computer system includes a network device, and a processor programmed or configured to programmatically access, via a network device, a textual unit, the textual unit associated with a commercial entity or a commercial object, and to execute a text processing engine to programmatically generate an attribute descriptor from the textual unit. The computer system also includes a non-transitory storage device for storing the attribute descriptor in association with identification of the commercial entity or the commercial object.

In certain embodiments, in generating an attribute descriptor for a first commercial entity or object, one or more consumer reviews on the first commercial entity or object may be used. In certain other embodiments, in generating an attribute descriptor for a first commercial entity or object, consumer reviews on one or more additional commercial entities or objects may be used. In certain other embodiments, in generating an attribute descriptor for a first commercial entity or object, consumer reviews on the first commercial entity or object and consumer reviews on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then consumer reviews on one entity may be analyzed to generate an attribute descriptor for the other entity.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
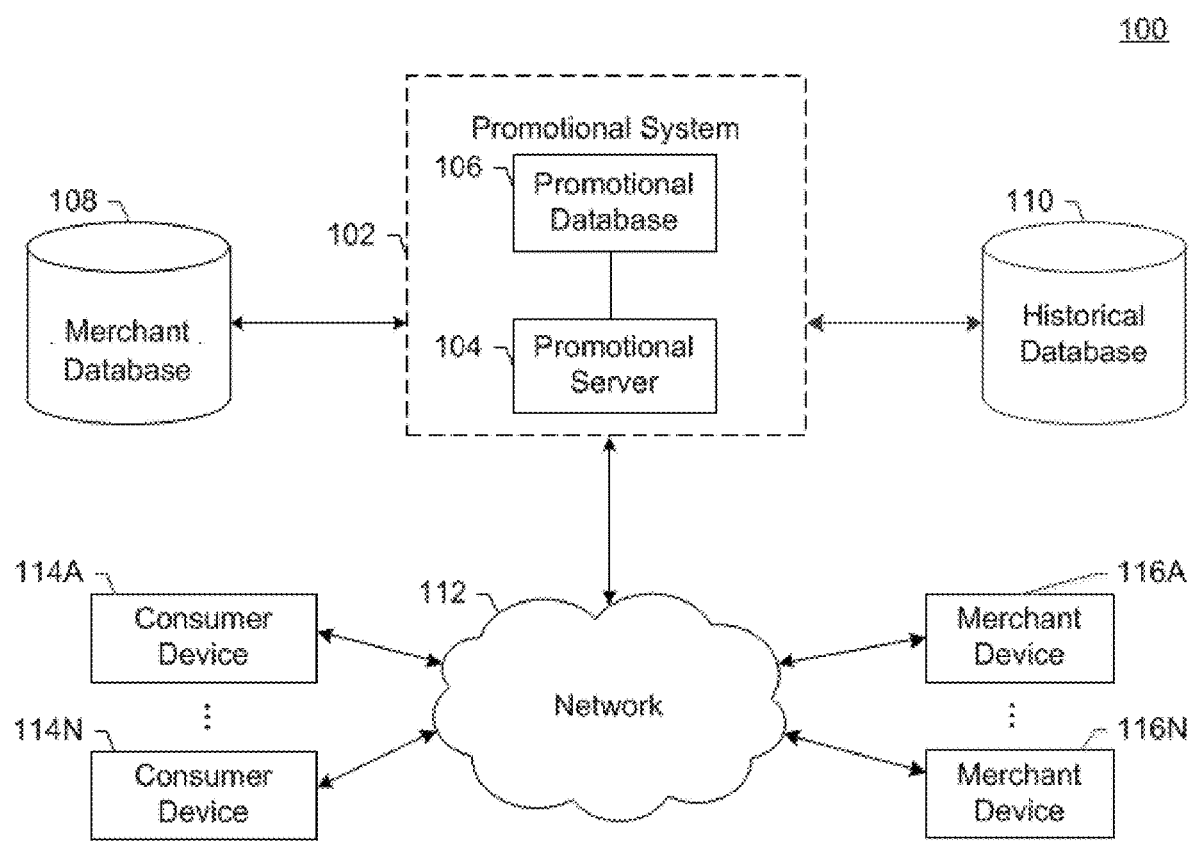
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for programmatically processing, analyzing and interpreting textual information to programmatically and automatically generate one or more attribute descriptors contained in the textual information. Exemplary textual information may include a review of a commercial entity (e.g., merchant, consumer) or a commercial object (e.g., product, service, promotion, experience), but is not limited to reviews. Exemplary embodiments are applicable to reviews and to textual information that do not constitute reviews. Exemplary textual information may include, without limitation, free-text, field-delimited text, one or more alphanumeric ratings, combinations thereof, and the like.

Quantitative and/or qualitative assessments of commercial entities or objects facilitate future consumers in making purchase decisions, but conventional assessment techniques of using consumer review information suffer from numerous deficiencies. Certain conventional assessment techniques require a consumer to present an overall review for a merchant or product even though making a purchase decision based on an overall review is often difficult. Furthermore, consumer reviews are long and difficult to produce and to read, which results in few consumers writing reviews or perusing them.

Exemplary embodiments address deficiencies in conventional consumer review processing techniques by, for example, programmatically extracting one or more attribute descriptors regarding a commercial entity or object from consumer reviews. In some embodiments, an "attribute descriptor" of a commercial entity or object may be a textual piece of data regarding the commercial entity or object. Attribute descriptors may be programmatically generated from text that may be opinionated (text including a subjective and polarized observation about a particular attribute descriptor, for example, a consumer review) or non-opinionated (e.g., general product descriptions). In some embodiments, corpuses for exemplary attribute descriptors may be developed by programmatically analyzing a body of consumer reviews and extracting attribute descriptors therefrom.

In certain cases, an attribute descriptor for a commercial entity (e.g., a merchant) may indicate a product or service sold by the merchant (e.g., "pasta," "burgers").

In certain cases, an attribute descriptor for a commercial object (e.g., a food item) may indicate a component, constituent or character of the object (e.g., vegetarian, fatty, gluten-free).

In certain cases, an attribute descriptor may indicate a contextual description or opinion describing a contextual feature or attribute of a commercial entity or object. Exemplary contextual attribute descriptors may describe, for example, a setting (e.g., attribute descriptor "romantic" may describe a restaurant as having a romantic setting), a situation, a physical environment (e.g., attribute descriptor "music"), hygiene, price level (e.g., attribute descriptor "cost"), a physical location (e.g., attribute descriptor "neighborhood safety"), and the like.

In certain cases, an attribute descriptor may indicate a quality associated with a commercial entity or object. Exemplary quality attribute descriptors may describe, for example, durability (e.g., attribute descriptor "rugged" may describe a durable pair of hiking boots), fragility (e.g., attribute descriptor "brittle"), size and/or weight (e.g., attribute descriptor "small and light"), cost effectiveness (e.g., attribute descriptor "value for money"), quality of customer service (e.g., attribute descriptor "customer service"), performance, and the like.

In certain cases, an attribute descriptor may indicate an event or happening regarding a commercial entity or object. Exemplary event attribute descriptors may indicate, for example, whether a consumer had to return a commercial object (e.g., attribute descriptor "returned it"), a consumer's specific experience (e.g., attribute descriptor "fails after 2 months"), and the like.

In certain cases, an attribute descriptor may broadly indicate a feature, categorization or sub-categorization of any feature of a commercial entity or object. Exemplary category or sub-category attribute descriptors may describe, for example, a subject matter associated with the commercial entity or object (e.g., attribute descriptor "outdoorsy" may describe an outdoor equipment retail store), a genre of a product (e.g., attribute descriptor "authentic Italian" or "fresh sushi" may describe a type of food sold by a restaurant), a feature or component of a commercial object (e.g., attribute descriptor "spicy" may describe food that is spicy, attribute descriptor "good for gaming" may describe a laptop that has a fast processor and good graphics, attribute descriptor "screen quality" may describe a laptop with a good quality screen), and the like.

In certain cases, an attribute descriptor may indicate a combination of two or more attributes of a commercial entity or object.

In certain embodiments, an attribute descriptor may have a predetermined maximum phrase, word or alphanumeric character length, e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, etc.

Certain multi-word attribute descriptors may include words that are present consecutively or immediately adjacent to each other within text. For example, a consumer review stating "their hiking boots are comfortable" may be programmatically analyzed to generate "hiking boots" as a multi-word attribute descriptor. Certain other multi-word attribute descriptors may include words that are not present consecutively or immediately adjacent to each other within text. For example, a consumer stating "great cheese in their burgers" may be programmatically analyzed to generate "cheese burger" as a multi-word attribute descriptor.

Certain attribute descriptors may be received, extracted or programmatically generated from consumer review information provided by consumers regarding one or more commercial entities and objects, for example, from consumer reviews, ratings and survey responses. In certain non-limiting cases, the consumer review information may be in the form of reviews that include structured or unstructured text. For structured text reviews, exemplary embodiments may programmatically generate attribute descriptors based on the names of the text fields (e.g., a text field titled "customer service" may be used to generate an attribute descriptor "customer service"). For unstructured text reviews, exemplary embodiments may programmatically generate attribute descriptors based on suitable grammatical context detection techniques. In certain cases, machine learning may be applied to determine an attribute descriptor based on consumer information previously provided for a commercial entity or object.

In certain cases, the consumer review information (e.g., reviews, ratings and survey responses) may be accessed from Internet websites using, for example, a web crawler. In certain cases, the consumer reviews, ratings and survey responses may be accessed from a database associated with a promotion and marketing service.

In certain embodiments, in generating an attribute descriptor for a first commercial entity or object, one or more consumer reviews on the first commercial entity or object may be used. In certain other embodiments, in generating an attribute descriptor for a first commercial entity or object, consumer reviews on one or more additional commercial entities or objects may be used. In certain other embodiments, in generating an attribute descriptor for a first commercial entity or object, consumer reviews on the first commercial entity or object and consumer reviews on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then consumer reviews on one entity may be analyzed to generate an attribute descriptor for the other entity.

One or more consumer ratings or reviews usable to determine an attribute descriptor may include one or more of: one or more quantitative ratings, one or more qualitative reviews, and the like.

In certain embodiments, a visual user interface may be customized for each consumer so that one or more commercial entities or objects are programmatically selected for display for that particular consumer. For example, attribute descriptors on the commercial entity or object may be compared to attribute descriptors of interest to the consumer to determine if the commercial entity or object is of relevance or interest to the consumer and, if so, to display consumer review information related to the commercial entity or object. For example, if an attribute descriptor for a merchant indicates that it is a "cheap" restaurant and if consumer information indicates that a consumer has a low income or is frugal, then the restaurant may be determined to be of relevance to the consumer and displayed on a computing device of the consumer.

In some embodiments, one or more attribute descriptors associated with a commercial entity or object may be displayed for a consumer. The top n number of attribute descriptors may be selected for display based on their relevance to the consumer. Certain embodiments may provide different visualization options to provide rating or review information in a succinct and easy to view manner. One exemplary visualization technique is a tag cloud in which each tag is an attribute descriptor.

In some cases, a consumer may be allowed to adjust the display of attribute descriptors associated with a commercial entity or object, for example, based on relevance or interest to the consumer, based on whether the attribute descriptor is spam, and the like.

I. Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "commercial entity" may include any commercial actor including, but not limited to, an individual, a consumer, a buyer, a seller, a group of individuals, a company, a retailer, a wholesaler, a service provider, a promotion and marketing service, and the like.

As used herein, the term "commercial object" may include any good, service or promotion that may be purchased or sold.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by an impression.

As used herein, the term "impression" may include a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. Exemplary Embodiments

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Although certain embodiments are described herein with reference to promotions and a promotion and marketing service, certain other embodiments are not thusly limited and may be implemented generally and without specific reference to promotions to a promotion and marketing service.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotion system 102 may have access to a merchant database or any suitable data storage structure 108 storing information on one or more merchants, one or more products offered by a merchant, one or more services offered by a merchant, and the like. The promotional system 102 may have access to a historical database or any suitable data storage structure 110 storing information regarding one or more of: promotions and impressions previously distributed to consumers, consumer profile data, prior activities performed by consumers with respect to promotions and impressions, prior activities performed by consumers with respect to commercial entities or objects, and the like. In various embodiments, promotional database 106, merchant database 108 and historical database 110 may be distinct databases, or may alternatively refer to a single database. In certain embodiments, merchant database 108 and historical database 110 may be provided independently of a promotional system 102.

Figure 2:
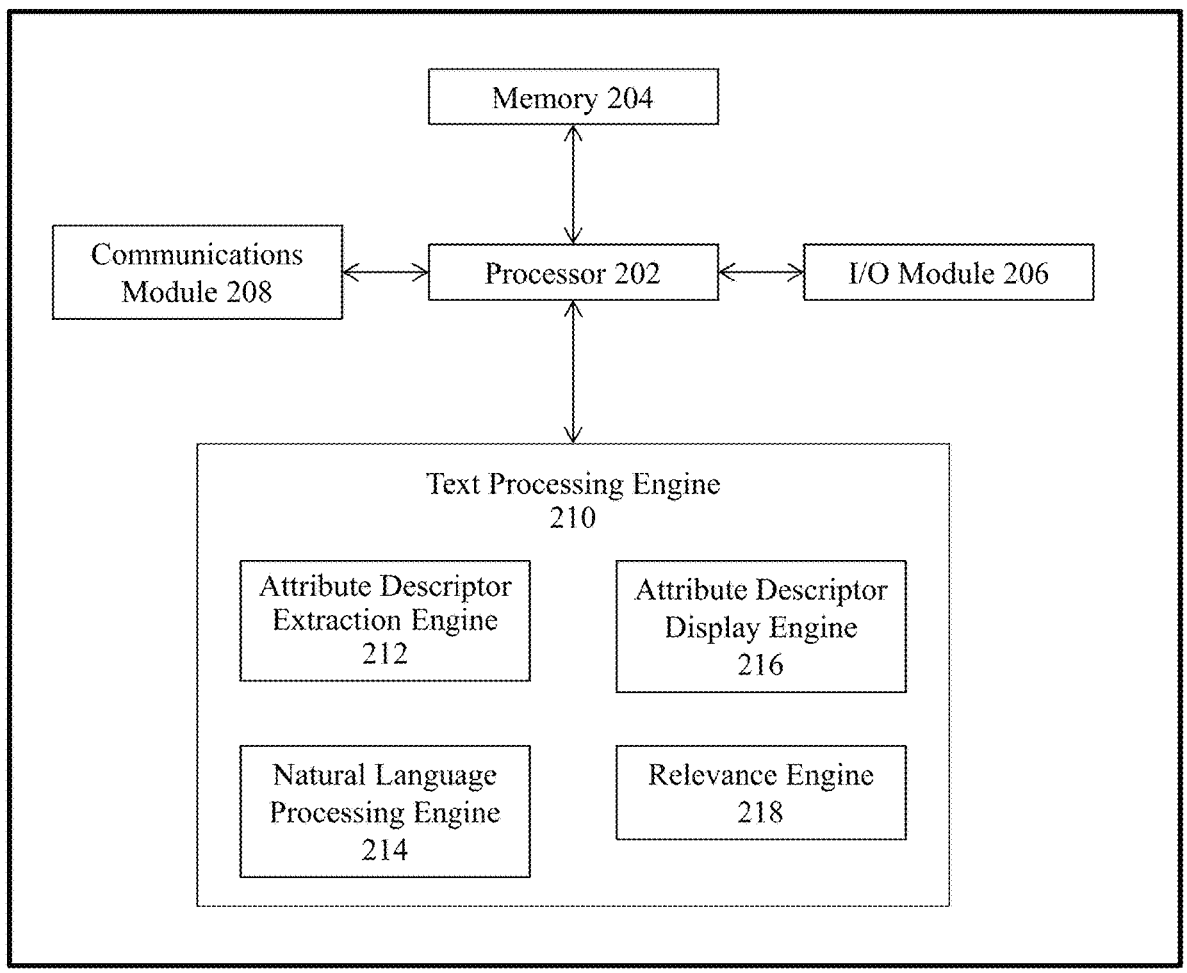
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a computer processor or computer processing module 202, a memory 204, an input/output module 206, and a communications module 208.

In some embodiments, the apparatus 200 may include a text processing engine 210 programmed or configured to programmatically and automatically process one or more consumer reviews with respect to a commercial entity or commercial object. The text processing engine 210 may take as input one or more consumer reviews for a single commercial entity or commercial object, or a plurality of consumer reviews for multiple commercial entities and/or commercial objects. The text processing engine 210 may extract and output one or more attribute descriptors associated with each consumer review.

The text processing engine 210 may include an attribute descriptor extraction engine 212 programmed or configured to programmatically extract one or more attribute descriptors from a consumer review. The attribute descriptor extraction engine 212 may implement and run computer-executed natural language processing techniques to identify words and/or phrases that may represent aspects (or attribute descriptors) for commercial entities and/or objects. In one embodiment, an attribute descriptor extraction engine 212 may generate a numerical score indicating the importance or usefulness of the identified attribute descriptor in the consumer review. The attribute descriptor extraction engine 212 may thereby generate a set or list of all useful or important attribute descriptors identified in the consumer review. For example, a consumer review that states "excellent burgers and good margaritas" may be analyzed to generate an attribute descriptor list of "burgers, margaritas."

The text processing engine 210 may include a natural language processing engine 214 programmed or configured to perform natural language processing techniques on text information processed by the text processing engine 210. The natural language processing engine 214 may be in data communication with the attribute descriptor extraction engine 212. The natural language processing engine 214 may take as input textual information received and processed by the attribute descriptor extraction engine 212, and generate as output a processed version of the textual information (e.g., the textual information tagged with parts-of-speech tags) and/or information on the textual information (e.g., parts-of-speech in the textual information).

The text processing engine 210 may include an attribute descriptor display engine 216 programmed or configured to selectively display one or more attribute descriptors on a visual display device. The consumer review display engine 216 may be in data communication with the attribute descriptor extraction engine 212 to receive the attribute descriptors generated by the attribute descriptor extraction engine 212. The attribute descriptor display engine 216 may use the communications module 208, e.g., a network device, to transmit computer-executable instructions to an external computing device to cause the external computing device to visually display the attribute descriptors.

The text processing engine 210 may include a relevance engine 218 programmed or configured to determine a relevance of a commercial entity or commercial object for a particular consumer based on the consumer's information (e.g., profile data of the consumer and/or data on prior activities of the consumer) and based on one or more attribute descriptors generated for the commercial entity or object. The relevance engine 218 may be in data communication with the attribute descriptor extraction engine 212 and the attribute descriptor display engine 216.

In one example, one or more profile data items of the consumer may be compared to one or more attribute descriptors of a particular commercial entity or object to determine if the consumer may be interested in the entity or object (e.g., if the profile data items indicate that the consumer may have particular interest in the attribute descriptors). For example, if the consumer's profile data item indicates that she is "outdoorsy," then a merchant with an attribute descriptor "hiking boots" may be determined to have particular relevance to the consumer. In this case, the merchant (and, optionally, the "hiking boots" attribute descriptor) may be recommended to the consumer by causing a consumer computing device to display a representation of the merchant and the attribute descriptor.

In another example, data on prior activities of the consumer may be compared to one or more attribute descriptors of a particular commercial entity or object to determine if the consumer may be interested in the entity or object (e.g., if the prior activities indicate that the consumer may have particular interest in the attribute descriptors). For example, if the consumer's prior activity data indicates that she frequently purchases "hiking boots," then a merchant with an attribute descriptor "hiking boots" may be determined to have particular relevance to the consumer. In this case, the merchant (and, optionally, the "hiking boots" attribute descriptor) may be recommended to the consumer by causing a consumer computing device to display a representation of the merchant and the attribute descriptor.

In another example, one or more profile data items and prior activity data of the consumer may be compared to one or more attribute descriptors of a particular commercial entity or object to determine if the consumer may be interested in the entity or object.

The profile data items may include, but are not limited to, an identification of the consumer, an age of the consumer, a gender of the consumer, a race of the consumer, an income of the consumer, a location associated with the consumer (e.g., a residential location, a work location), a merchant preference of the consumer, a category or sub-category of interest to the consumer, a product preference of the consumer, a price preference of the consumer, and the like. The prior activity data may include, but are not limited to, data on one or more purchase activities, one or more product or merchant viewing activities, one or more product or merchant rating activities, one or more promotion viewing activities, one or more promotion rating activities, and the like.

In some embodiments, the processor 202 (and/or coprocessor or any other processing circuitry assisting or otherwise associated with the processor) may be in communication with the memory 204 via a bus for transmitting information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
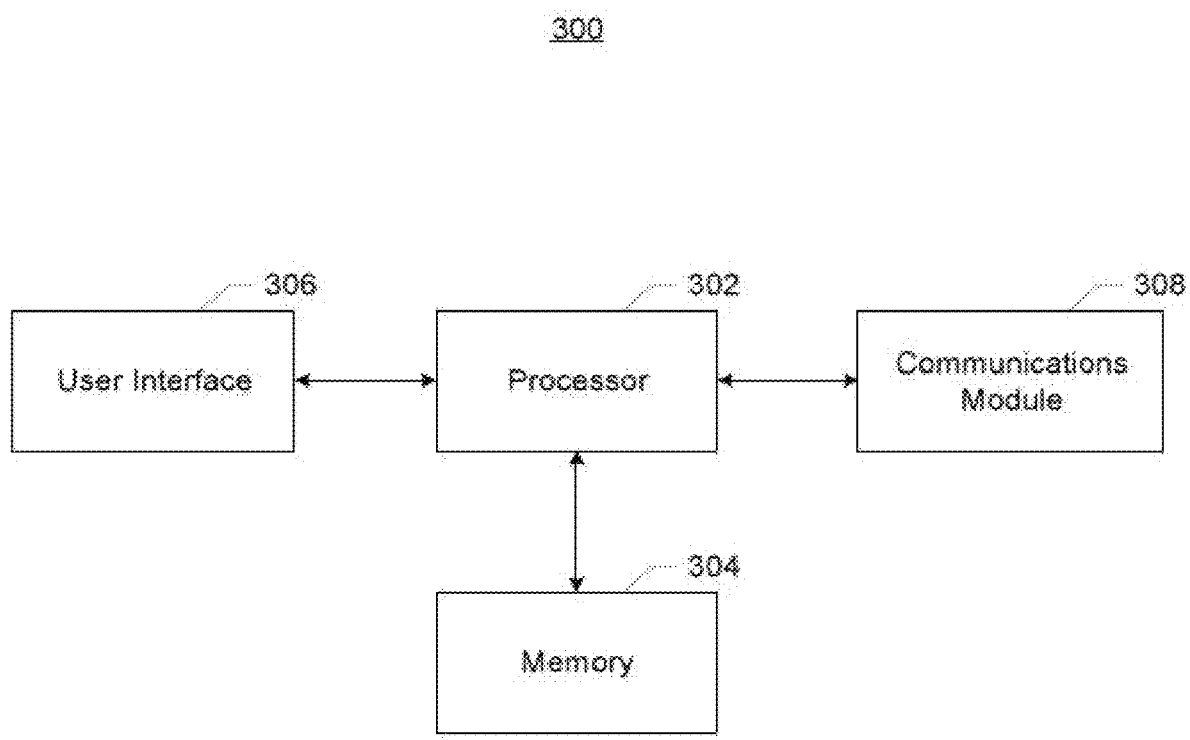
FIG. 3 is a block diagram illustrating exemplary modules of a computing device for use by a consumer or merchant in accordance with an exemplary embodiment.

Referring now to FIG. 3, a block diagram is illustrated showing an example end-user device, apparatus 300, that may be configured to enable a user to view promotions from outside the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Figure 4:
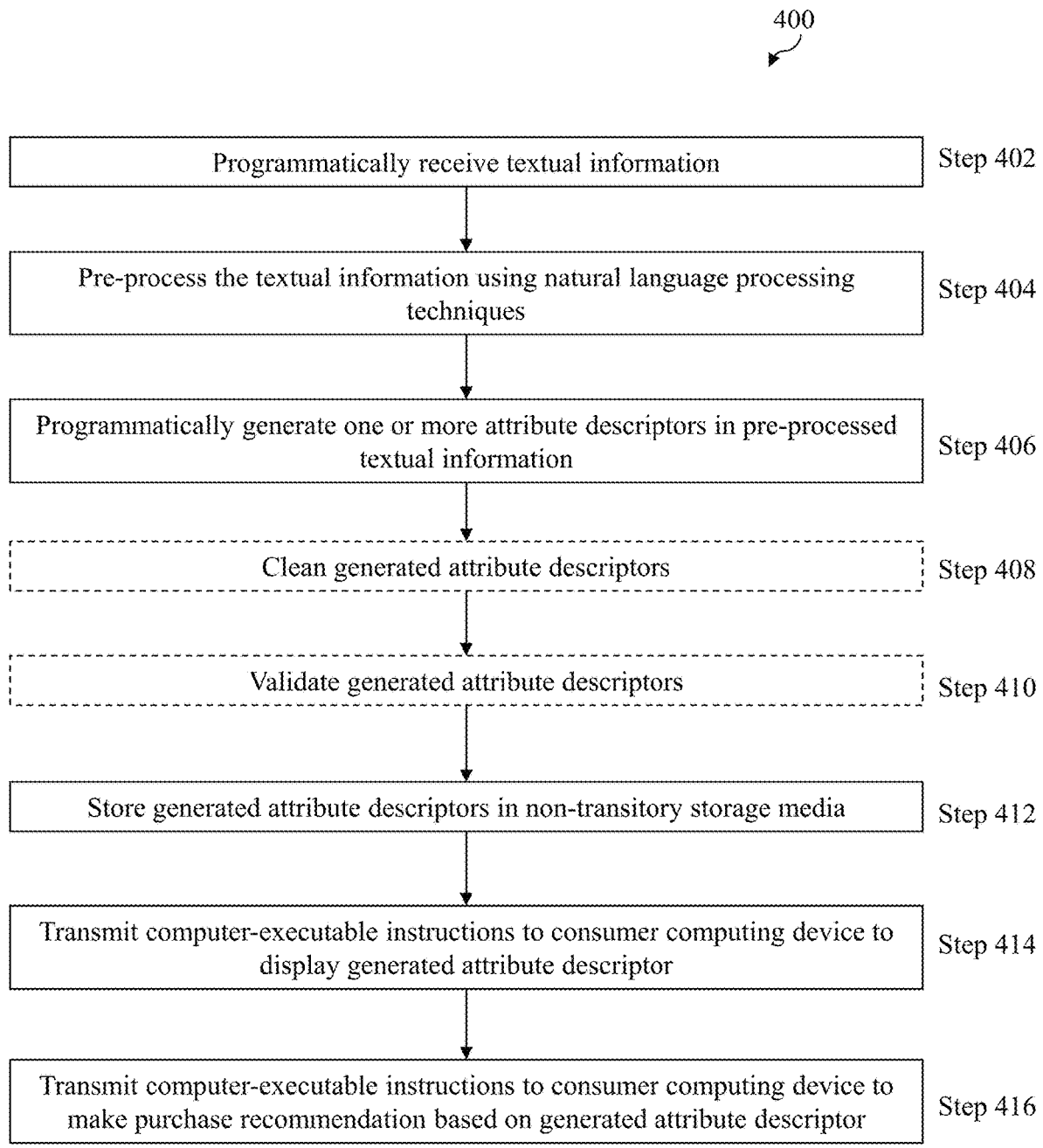
FIG. 4 is a flowchart illustrating an exemplary computer-executable method for programmatically generating attribute descriptors within textual information.

FIG. 4 is a flowchart illustrating an exemplary computer-implemented method 400 of identifying and generating attribute descriptors contained in textual information, e.g., text-based consumer reviews. The textual information processed in the method of FIG. 4 may constitute any textual unit including, without limitation, a full consumer review, a collection of multiple consumer reviews, a set of paragraphs, a paragraph, a sentence, a phrase, a word, and the like.

In step 402, the text processing engine 210 (more particularly, the attribute descriptor extraction engine 212) may programmatically receive textual information from a non-transitory computer-readable storage device via a network device.

In step 404, the attribute descriptor extraction engine 212 may pre-process the textual information received.

In step 406, the attribute descriptor extraction engine 212 may programmatically analyze the pre-processed textual information to generate one or more attribute descriptors contained therein.

In step 408, the attribute descriptor extraction engine 212 may clean the generated attribute descriptors to generate a list of attribute descriptors.

In step 410, in a non-limiting exemplary embodiment, the list of attribute descriptors generated in step 408 may be validated by human or automated validation techniques. In one embodiment, the validation may be performed using crowd-sourcing techniques.

In step 412, the attribute descriptors generated in step 408 (and validated in step 410 in some embodiments) may be stored on a non-transitory computer-readable media. The attribute descriptors may be stored in association with identification of a commercial entity or object for which the attribute descriptors apply. In one exemplary embodiment, textual units (e.g., consumer reviews) and their associated attribute descriptors may be saved in a non-transitory computer-readable storage device to create a repository of consumer feedback from a broad audience.

In step 414, the attribute descriptor display engine 216 may transmit computer-executable instructions to a consumer's computing device to display one or more of the generated attribute descriptors. The computer-executable instructions may, in some cases, be transmitted in response to a request from the consumer computing device for information on the commercial entity or object. In some cases, the request may specify the commercial entity or object. In some cases, the request may specify one or more attribute descriptors of interest to the consumer and, in response, information on commercial entities or objects having those attribute descriptors may be displayed.

In step 416, the relevance engine 218 may transmit computer-executable instructions to a consumer's computing device to make a purchase recommendation based on one or more generated attribute descriptors.

In one example, one or more profile data items of the consumer may be compared to one or more attribute descriptors of a particular commercial entity or object to determine if the consumer may be interested in the entity or object (e.g., if the profile data items indicate that the consumer may have particular interest in the attribute descriptors). For example, if the consumer's profile data item indicates that she is "outdoorsy," then a merchant with an attribute descriptor "hiking boots" may be determined to have particular relevance to the consumer. In this case, the merchant (and, optionally, the "hiking boots" attribute descriptor) may be recommended to the consumer by causing a consumer computing device to display a representation of the merchant and the attribute descriptor.

In another example, data on prior activities of the consumer may be compared to one or more attribute descriptors of a particular commercial entity or object to determine if the consumer may be interested in the entity or object (e.g., if the prior activities indicate that the consumer may have particular interest in the attribute descriptors). The prior activity data may indicate purchase activities, commercial recommendation viewing activities, promotion redemption activities, and the like. For example, if the consumer's prior activity data indicates that she frequently purchases "hiking boots," then a merchant with an attribute descriptor "hiking boots" may be determined to have particular relevance to the consumer. In this case, the merchant (and, optionally, the "hiking boots" attribute descriptor) may be recommended to the consumer by causing a consumer computing device to display a representation of the merchant and the attribute descriptor.

In another example, one or more profile data items and prior activity data of the consumer may be compared to one or more attribute descriptors of a particular commercial entity or object to determine if the consumer may be interested in the entity or object.

In one exemplary embodiment, the attribute descriptors identified from consumer reviews may be used to generate survey queries to allow consumers to review and rate commercial entities and objects. For example, exemplary embodiments may analyze consumer reviews associated with one or more restaurants to generate attribute descriptor "burgers," and may generate a survey query for Restaurant X to ask consumers "Is Restaurant X great for burgers?" Details of generating survey queries are contained in U.S. Provisional Patent Application No. 62/018,456, incorporated by reference above.

Figure 5:
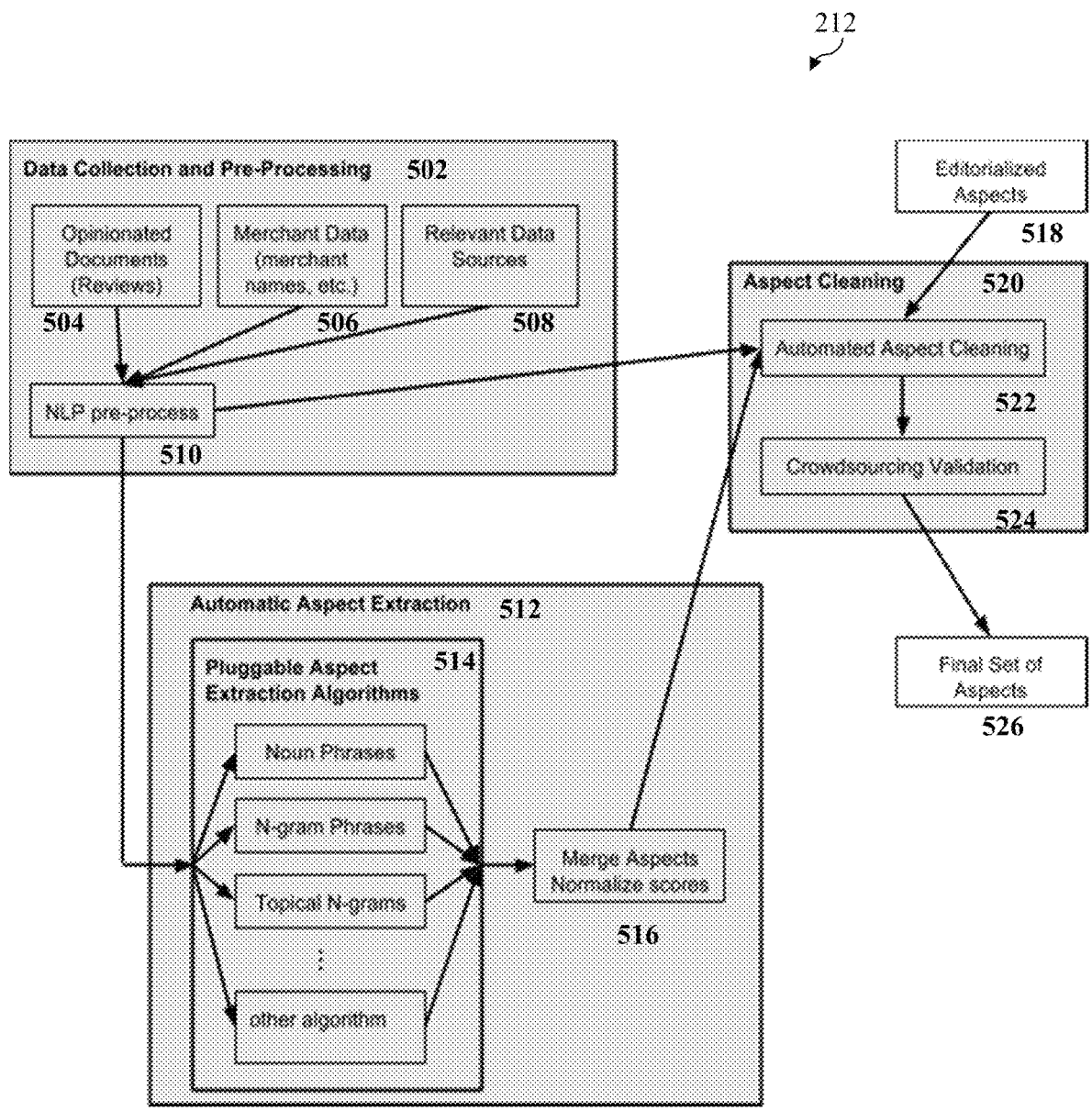
FIG. 5 is a block diagram illustrating exemplary computer-executed modules of an exemplary attribute descriptor extraction engine.

FIG. 5 is a block diagram illustrating exemplary computer-executed modules of an exemplary attribute descriptor extraction engine 212. A data collection and pre-processing module 502 may be programmed or configured to programmatically access textual information which may include, but is not limited to, opinionated textual information (e.g., consumer reviews) 504, merchant data (e.g., merchant names) 506, relevant data sources 508. The opinionated textual information 504 may contain opinions related to a particular commercial entity or object. These may include, for example, reviews from post redemption surveys, tips delivered by consumers in the merchant pages, and the like. The merchant data 506 may be used to remove matches of the name in the input reviews, as the name is not a useful attribute descriptor that could be extracted. The relevant data sources 508 may be related to elements that could be used to clean generated attribute descriptors or other data sources that could improve the attribute descriptor extraction process, including, without limitation, dictionaries, specialized lexicons, and the like.

A natural language pre-processing module 510 may be programmed or configured to pre-process data in the data sources 504, 506, 508. As the key input data source is natural language, it is important to both clean the data, and transform it so that it may be used for attribute descriptor extraction techniques implemented in the attribute descriptor extraction engine 212.

In one exemplary pre-processing technique, every word is labeled in the input textual information with parts-of-speech tagging (POS Tagging). For example, textual information stating "The food was great" may be pre-processed to generate "(the (DT)) (food (NN)) (was (VBD)) great (JJ)))"[1]. This pre-processing step may be used as input for the different attribute descriptor extraction techniques.

[1]DT: determiner, NN: noun, VBD: verb, past tense, JJ: adjective. Defined by the Penn TreeBank (https://www.ling.upenn.edu/courses/Fall_2003/ling001/penn_treebank_pos.html), the entire contents of which are expressly incorporated herein by reference.

In another exemplary pre-processing technique, the words in the textual information may be processed into lemmas to allow the attribute descriptor extraction techniques to recognize situations in which different word forms refer to the same attribute descriptor. For example, plural forms may be converted to the singular form (e.g., burgers to burger).

In another exemplary pre-processing technique, a spell-checking system is used to improve the quality of the attribute descriptors that are extracted. The spell checker is trained using a corpus of textual information so that it can recognize domain-specific terms and names. This improves the quality of the attribute descriptors by removing misspelled words and by reducing the number of near-duplicates caused by attribute descriptors with varied (but still correct) spellings.

Other techniques for pre-processing and cleaning the textual information may be related to word-sense disambiguation to identify the true meaning of the words involved in a sentence, especially for words with multiple definitions. For example, the "hot" may be disambiguated based on its context, e.g., "hot" related to weather conditions or "hot" used to describe spicy food. Other techniques for pre-processing and cleaning the textual information may perform constituent grammars analysis (phrase structure grammar or dependency grammar) to identify nouns or noun phrases, or implicit nouns, to which the textual information (e.g., consumer review) is referring to. Other techniques for pre-processing and cleaning the textual information may implement machine learning/computational linguistic techniques to clean the input textual information and/or improve the attribute descriptor extraction techniques.

An automatic attribute descriptor extraction module 512 may be programmed or configured to extract or generate attribute descriptors in the pre-processed textual information generated by the natural language pre-processing module 510. The attribute descriptor extraction module 512 may include one or more modules 514 implement different attribute descriptor extraction techniques.

In one embodiment, the modules 514 may be modular and pluggable so that different combinations of the modules 514 may be selected and used. For example, the modules 514 may be designed to accept a standard set of input data, and output candidate attribute descriptors in a standard format. This allows addition of new extraction techniques or removal current techniques without altering any other parts of the system. In an appropriate computational environment, the extraction techniques 514 may be run in parallel, and may incorporate parallelism themselves.

Certain exemplary modules 514 implementing computer-executable attribute descriptor extraction techniques are described below.

Noun Phrase Extraction: This technique considers the POS tagging from the previous natural language pre-processing module 510, and generates a frequency-based set of phrases from the reviews, but exclusively noun phrases (i.e., consecutive words with NN, NNS, NNP, NNPS tags[2]). This strategy may be generated for n-grams, with n>0. This technique allows extraction of terms like "chicken tikka masala" when using noun phrases with n=3, "ice cream" when using n=2, and the like. All noun phrases of this form may be extracted, filtered through a list of excluded terms, and only those noun phrases that occur frequently may be stored.

[2]NN: noun, NNS: noun, plural, NNP: proper noun, NNPS: proper noun, plural.

N-Gram Phrases: N-Gram phrases are also known as "collocations," or a habitual words combination, or sequence of words that can co-occur more than other sequences. An exemplary technique allows for one or more intervening words to appear in the text, without necessary including them in the resulting attribute descriptor. For example, the phrase "the cheese in the burger" would be recognized as belonging to the attribute descriptor "cheese burger." The technique may be tuned to find collocations of two, three, or more terms, and/or several different lengths. The POS tags may be used to filter out collocations that are unlikely to result in useful or good attribute descriptors. Generally, noun sequences are preferred, but some patterns with non-nouns may also be included ("hot stone massage"). The remaining collocations may be ranked using a statistical calculation (e.g., pointwise mutual information, likelihood ratio, or a similar method), and the top scoring collocations may be retained.

Topical N-Grams: This technique, based in some predefined probability distribution functions and an input number of topics to find (N), learns a probabilistic topic representation of each textual unit (e.g., consumer review or document) and the n-grams (a set of n consecutive words) associated to each topic. An exemplary topical n-gram technique may be divided into the following steps:

1. For each textual unit (e.g., consumer review or document), randomly assign each n-gram to one of the N topics.
2. Iterate each topic
   a. Compute the Probability(topic t|document d) (using n-grams in the documents and topics) and Probability(n-grams|topic t).
   b. Reassign the n-gram to a new topic based on Probability(topic t|document d)*Probability(n-gram|topic t)
3. Repeat previous process for a given number of times. The assignments of the n-grams to topics will start converging to the n-grams that are most likely to generate the textual units given as input (e.g., set of reviews).
4. Some n-grams are less likely to appear so they may be ranked per topic based on this probability. At the end, less likely n-grams in a topic can be pruned by setting an input threshold (only top k n-grams per topic).

Other attribute descriptor extraction techniques may be used to complement the previously mentioned techniques in some embodiments including, for example, deterministic and probabilistic methods. Some of these techniques include, without limitation, multi-grain Latent Dirichlet Allocation (LDA), hierarchical LDA, Pitman-Yor processes (aka, Chinese Restaurant Process), Hierarchical Pitman-Yor Language Models, Phrase-Discovery LDA, other machine learning techniques, and the like.

A merging module 516 is programmed or configured to merge the results (a list of attribute descriptors and, optionally, scores) of each attribute descriptor extraction technique, to normalize the scores and combine the scores. In some embodiments, each attribute descriptor extraction technique may generate a score indicating a likelihood that a generated attribute descriptor is corrected identified. The final score may be calculated as a linear combination of the normalized score from each attribute descriptor extraction technique. This allows the system to assign different weights to each of the attribute descriptor extraction techniques to emphasize or de-emphasize the effect of each technique.

An attribute descriptor cleaning module 520 is programmed or configured to "clean" or validate the generated attribute descriptors via automatic techniques to minimize the overall set of attribute descriptors available. In some cases, to generate a high quality list of attribute descriptors, a human-driven cleaning step may be used to validate the generated attribute descriptors (for example, by crowdsourcing). In some cases, a list of editorialized attribute descriptors 518 may be included as input (e.g., attribute descriptors generated by an editorial team that could be considered important). In other cases, automatic techniques may be used to validate the generated attribute descriptors. The attribute descriptor cleaning module 520 thereby generates a validated set of attribute descriptors 526.

Automated attribute descriptor cleaning techniques: As presented in FIG. 5, an automatic attribute descriptor cleaning module 522 is programmed or configured to integrate the raw output from the attribute descriptor extraction module 512 with some of the output from the natural language pre-processing module 510 with other attribute descriptor sources (e.g., editorialized attribute descriptors predefined by other mechanisms) in order to remove some low-quality attribute descriptors. In this module 522, some of the cleaning strategies may perform spell checking to remove misspelled attribute descriptors, remove attribute descriptors containing blacklisted words, remove attribute descriptors containing repeated words, and other anomalies that would generate low-quality attribute descriptors.

In some cases, the spell checking technique may be trained specifically to the context of a promotion and marketing service as the service may use some words most often related to certain terms rather than others. For example, a generic spell-checker may attempt to assign the term "foof" to "foot," while in the context of restaurant reviews, the expected fix may be "food". This does not only help for suggested corrections, but also to capture specific terms that might not be included in generic spell checkers (e.g., "tikka" or "masala" in the attribute descriptor "chicken tikka masala").

Crowd-sourced attribute descriptor cleaning techniques: As presented in FIG. 5, a crowd-sourced attribute descriptor cleaning module 524 is programmed or configured to generate a human-curated list of words/phrases that would describe any potentially polarized attribute descriptor of a commercial entity or object that may influence a consumer's decision to do business with the entity. "Potentially polarized" means that the attribute descriptor may be described in a potentially positive or negative context. This human-curated list of potentially polarized attribute descriptors may be generated by removing certain attribute descriptors from the output list from the automated attribute descriptor cleaning module 522. Some consumers may consider an attribute descriptor to be important, while some others may not. Exemplary attribute descriptor extraction and cleaning techniques attempt to cover as much of these two scenarios as possible. Certain embodiments may include information on the relevancy of certain attribute descriptors for a given persona, consumer or segment of consumers.

Figure 6A:
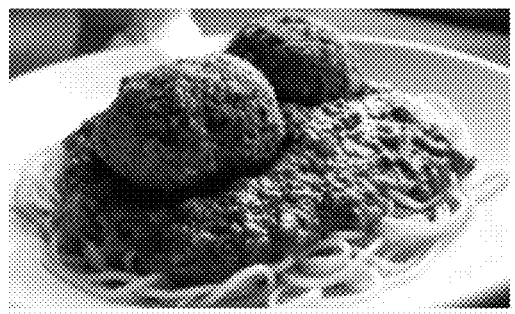
FIGS. 6A and 6B illustrate exemplary user interfaces rendered on a consumer's computing device, each user interface displaying an attribute descriptor for a merchant.
Figure 6B:
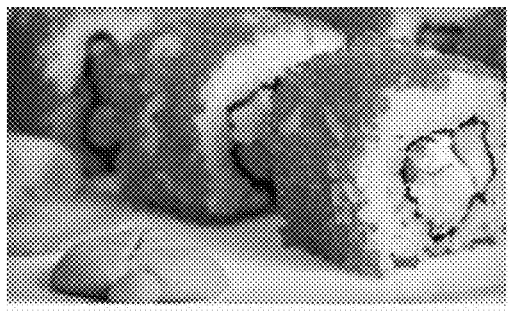

FIGS. 6A and 6B illustrate exemplary user interfaces 600a and 600b, respectively, each recommending a particular merchant to a consumer and including an attribute descriptor for the merchant that is determined to be of particular relevance for that consumer. The relevance to the consumer may be determined by the relevance engine 218 based on the consumer's prior activity data and/or profile data. For example, FIG. 6A indicates an Italian restaurant and an attribute descriptor of "pasta." FIG. 6B indicates a Japanese restaurant and an attribute descriptor of "sushi."

III. Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 7:
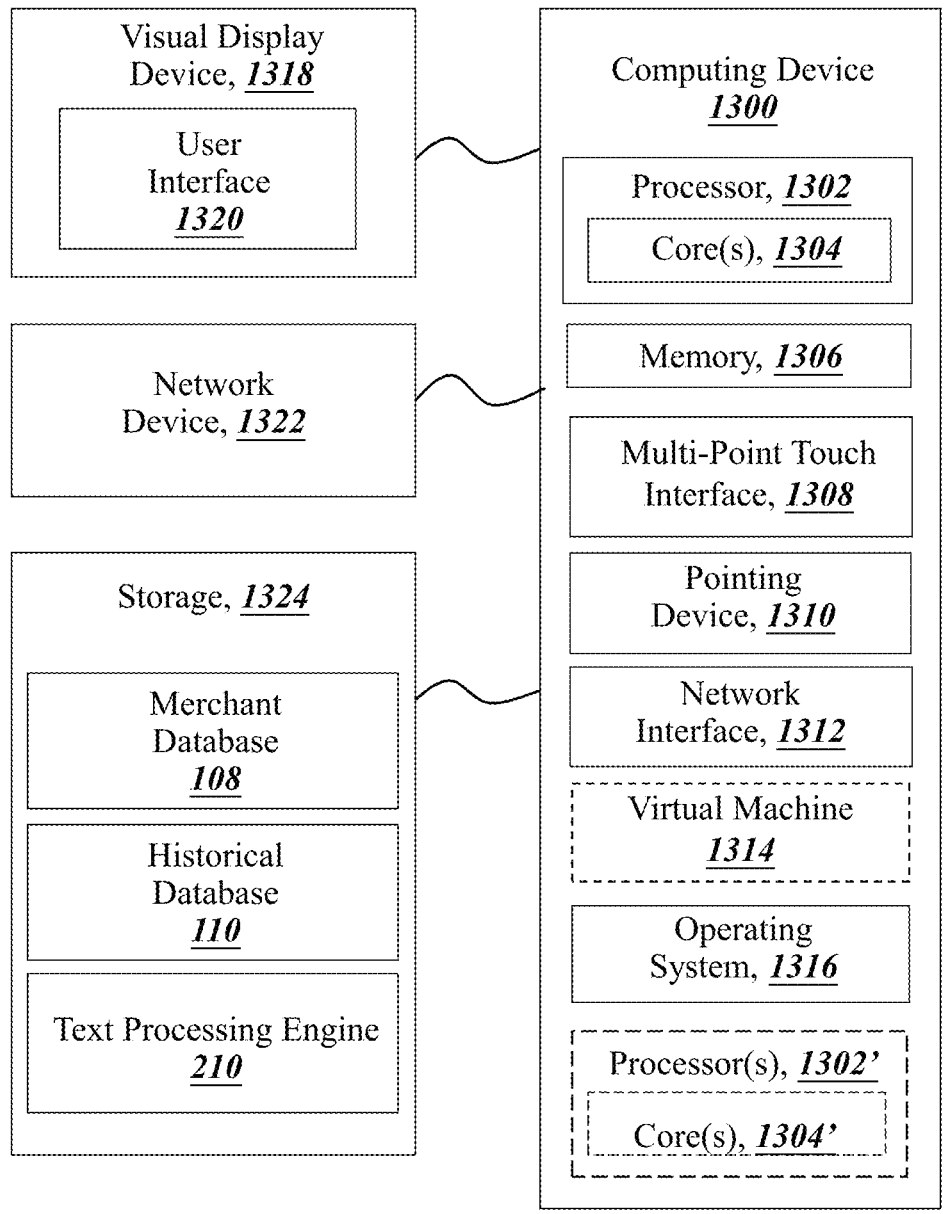
FIG. 7 is a block diagram of an exemplary computing device that may be used to implement and execute exemplary computer-executable methods.

FIG. 7 depicts a block diagram representing an exemplary computing device 1300 that may be used to implement the systems and methods disclosed herein. The computing device 1300 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1300 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1306 included in the computing device 1300 may store computer-readable and computer-executable instructions or software for implementing a graphical user interface as described herein. The computing device 1300 also includes processor 1302 and associated core 1304, and in some embodiments, one or more additional processor(s) 1302' and associated core(s) 1304' (for example, in the case of computer systems having multiple processors/cores), for executing computer-readable and computer-executable instructions or software stored in the memory 1302 and other programs for controlling system hardware. Processor 1302 and processor(s) 1302' may each be a single core processor or a multiple core (1304 and 1304') processor.

Virtualization may be employed in the computing device 1300 so that infrastructure and resources in the computing device may be shared dynamically. A virtual machine 1314 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1318, such as a screen or monitor, which may display one or more graphical user interfaces 1320 provided in accordance with exemplary embodiments described herein. The visual display device 1318 may also display other aspects, elements and/or information or data associated with exemplary embodiments.

The computing device 1300 may include other I/O devices for receiving input from a user, for example, a keyboard or any suitable multi-point touch interface 1308 or pointing device 1310 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1308 and the pointing device 1310 may be coupled to the visual display device 1318. The computing device 1300 may include other suitable conventional I/O peripherals. The I/O devices may facilitate implementation of the one or more graphical user interfaces 1320, for example, implement one or more of the graphical user interfaces described herein.

The computing device 1300 may include one or more storage devices 1324, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1324 may provide storage for data that may be generated by the systems and methods of the present disclosure. For example, a storage device 1324 may provide storage for a merchant database 108 including information on one or more merchants, and for a historical database 110 including information on one or more prior activities performed by consumers and profile information on consumers. A storage device 1324 may also provide storage for a text processing engine 210. The one or more storage devices 1324 may be provided on the computing device 1300 and/or provided separately or remotely from the computing device 1300. The exemplary components depicted as being stored on storage device 1324 may be stored on the same or on different storage devices.

The computing device 1300 may include a network interface 1312 configured to interface via one or more network devices 1322 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1312 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein. The network device 1322 may include one or more suitable devices for receiving and transmitting communications over the network including, but not limited to, one or more receivers, one or more transmitters, one or more transceivers, one or more antennae, and the like.

The computing device 1300 may run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 may be run in native mode or emulated mode. In an exemplary embodiment, the operating system 1316 may be run on one or more cloud machine instances.

One of ordinary skill in the art will recognize that exemplary computing device 1300 may include more or fewer modules than those shown in FIG. 7.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by ¹/₂₀th, ¹/₁₀th, ⅕th, ⅓rd, ½nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. A computer-executed method for programmatically generating an attribute descriptor from a textual unit, the method comprising:
 programmatically accessing, via a network device, a textual unit, the textual unit associated with a commercial entity or a commercial object;
 executing a text processing engine to programmatically generate a set of attribute descriptors associated with the commercial entity or the commercial object from the textual unit based on:

preprocessing textual information from the textual unit to determine a set of pre-processed attribute descriptors; and performing an attribute descriptor cleaning process with respect to the set of pre-processed attribute descriptors to generate the set of attribute descriptors associated with the commercial entity or the commercial object, wherein the attribute descriptor cleaning process is associated with spell checking that is trained based on context of the commercial entity or the commercial object;

validating the set of attribute descriptors by:
comparing each attribute descriptor of the set of attribute descriptors to an attribute descriptor record to identify a common attribute descriptor sub-set shared by the set of attribute descriptors and the attribute descriptor record, wherein the attribute descriptor record is generated before the set of attribute descriptors is generated, and wherein the attribute descriptor record comprises one or more blacklisted attribute descriptors; and
generating a validated list of attribute descriptors by removing the common attribute descriptor sub-set from the set of attribute descriptors;

storing, on a non-transitory computer-readable storage device, the validated list of attribute descriptors in association with identification of the commercial entity or the commercial object; and transmitting, via the network device, one or more computer-executable instructions to a computing device, the one or more computer-executable instructions programmed to cause the computing device to visually display one or more attribute descriptors from the validated set of attribute descriptors in association with the commercial entity or the commercial object.

2. The method of claim 1, wherein preprocessing textual information from the textual unit includes one or more of:
performing parts-of-speech tagging of words from the textual information;
converting the words from the textual information into lemmas; or
performing disambiguation of the words from the textual information.

3. The method of claim 1, wherein performing the attribute descriptor cleaning process to generate the attribute descriptor includes using one or more of:
noun phrase extraction;
N-gram phrases; or
topical N-grams.

4. The method of claim 1, wherein performing the attribute descriptor cleaning process to generate the attribute descriptor includes using one or more of:
multi-grain Latent Dirichlet Allocation (LDA);
hierarchical LDA;
Pitman-Yor processes;
Hierarchical Pitman-Yor Language Models; or
Phrase-Discovery LDA.

5. The method of claim 1, wherein validating the list of attribute descriptors includes at least one of: an automated attribute descriptor cleaning; or a crowd-sourced attribute descriptor cleaning.

6. The method of claim 1, further comprising:
programmatically analyzing prior purchase data or profile data associated with a first consumer to generate a first attribute descriptor of interest to the first consumer;

programmatically matching the first attribute descriptor to the attribute descriptor generated based on the textual unit; and based on the matching, transmitting computer-executable instructions to a computing device associated with the first consumer to cause a visual display device associated with the computing device to display the attribute descriptor in association with the commercial entity or the commercial object.

7. The method of claim 1, wherein the commercial entity is one of a merchant, product, service, or promotion.

8. The method of claim 1, wherein the attribute descriptor indicates at least one of:
context associated with the commercial entity or the commercial object;
a quality associated with the commercial entity or the commercial object; or
a category or sub-category associated with the commercial entity or the commercial object.

9. An apparatus operable on a distributed computing system, the apparatus comprising:
a network device;
a processor programmed or configured to programmatically access, via the network device, a textual unit, the textual unit associated with a commercial entity or a commercial object, the processor further programmed or configured to:
execute a text processing engine to programmatically generate a set of attribute descriptors associated with the commercial entity or the commercial object from the textual unit based on:
preprocessing textual information from the textual unit to determine a set of pre-processed attribute descriptors;
performing an attribute descriptor cleaning process with respect to the set of pre-processed attribute descriptors to generate the set of attribute descriptors associated with the commercial entity or the commercial object, wherein the attribute descriptor cleaning process is associated with spell checking that is trained based on context of the commercial entity or the commercial object;
validating the set of attribute descriptors by:
comparing each attribute descriptor of the set of attribute descriptors to an attribute descriptor record to identify a common attribute descriptor sub-set shared by the set of attribute descriptors and the attribute descriptor record, wherein the attribute descriptor record is generated before the set of attribute descriptors is generated; and
generating a validated list of attribute descriptors by removing the common attribute descriptor sub-set from the set of attribute descriptors;
transmit, via the network device, one or more computer-executable instructions to a computing device, the one or more computer-executable instructions programmed to cause the computing device to visually display one or more attribute descriptors from the validated set of attribute descriptors in association with the commercial entity or the commercial object; and
a non-transitory storage module for storing the validated list of attribute descriptors in association with identification of the commercial entity or the commercial object.

10. The apparatus of claim 9, wherein preprocessing textual information from the textual unit includes one or more of:
    performing parts-of-speech tagging words from the textual information;
    converting the words from the textual information into lemmas; or
    performing disambiguation of the words from the textual information.

11. The apparatus of claim 9, wherein performing the attribute descriptor cleaning process to generate the attribute descriptor includes using one or more of:
    noun phrase extraction;
    N-gram phrases; or
    topical N-grams.

12. The apparatus of claim 9, wherein performing the attribute descriptor cleaning process to generate the attribute descriptor includes using one or more of:
    multi-grain Latent Dirichlet Allocation (LDA);
    hierarchical LDA;
    Pitman-Yor processes;
    Hierarchical Pitman-Yor Language Models; or
    Phrase-Discovery LDA.

13. The apparatus of claim 9, wherein the processor programmed or configured to execute the text processing engine to programmatically validate the list of attribute descriptors includes at least one of: an automated attribute descriptor cleaning; or a crowd-sourced attribute descriptor cleaning.

14. The apparatus of claim 9, wherein the processor is further programmed or configured to:
    programmatically analyze prior purchase data or profile data associated with a first consumer to generate a first attribute descriptor of interest to the first consumer;
    programmatically match the first attribute descriptor to the attribute descriptor generated based on the textual unit; and
    based on the matching, transmit computer-executable instructions to a computing device associated with the first consumer to cause a visual display device associated with the computing device to display the attribute descriptor in association with the commercial entity or the commercial object.

15. The apparatus of claim 9, wherein the commercial entity is one of a merchant, product, service, or promotion.

16. The apparatus of claim 9, wherein the attribute descriptor indicates at least one of:
    context associated with the commercial entity or the commercial object;
    a quality associated with the commercial entity or the commercial object; or
    a category or sub-category associated with the commercial entity or the commercial object.

17. One or more non-transitory computer-readable media having encoded thereon one or more computer-executable instructions that, when executed on a computer, cause performance of a computer-executed method, the method comprising:
    programmatically accessing, via a network device, a textual unit, the textual unit associated with a commercial entity or a commercial object;
    executing a text processing engine to programmatically generate an attribute descriptor associated with the commercial entity or the commercial object from the textual unit based on:
        preprocessing textual information from the textual unit to determine a set of pre-processed attribute descriptors;
        performing an attribute descriptor cleaning process with respect to the set of pre-processed attribute descriptors to generate the attribute descriptor associated with the commercial entity or the commercial object, wherein the attribute descriptor cleaning process is associated with spell checking that is trained based on context of the commercial entity or the commercial object;
    generating a list of attribute descriptors based on the attribute descriptor and one or more other attribute descriptors generated from the from the textual unit;
    validating the list of attribute descriptors by:
        comparing each attribute descriptor of the set of attribute descriptors to an attribute descriptor record to identify a common attribute descriptor sub-set shared by the set of attribute descriptors and the attribute descriptor record, wherein the attribute descriptor record is generated before the set of attribute descriptors is generated, and wherein the attribute descriptor record comprises one or more blacklisted attribute descriptors; and
        generating a validated list of attribute descriptors by removing the common attribute descriptor sub-set from the set of attribute descriptors;
    storing, on a non-transitory computer-readable storage device, the validated list of attribute descriptors in association with identification of the commercial entity or the commercial object; and
    transmitting, via the network device, one or more computer-executable instructions to a computing device, the one or more computer-executable instructions programmed to cause the computing device to visually display one or more attribute descriptors from the validated set of attribute descriptors in association with the commercial entity or the commercial object.

* * * * *